United States Patent

Mercier

[15] 3,656,572
[45] Apr. 18, 1972

[54] VEHICLES WITH INCIDENCE-ANGLE DRIVING WHEELS

[72] Inventor: Pierre Ernest Mercier, 1, Route de Saint-Brice, Piscop, France

[22] Filed: Mar. 4, 1970

[21] Appl. No.: 16,300

[30] Foreign Application Priority Data

Mar. 4, 1969 France..............................6905804

[52] U.S. Cl. ..............................180/21, 180/72, 280/112 A
[51] Int. Cl. ..............................................................B62d 61/04
[58] Field of Search..............................180/21; 280/112.1

[56] References Cited

UNITED STATES PATENTS

| | | | |
|---|---|---|---|
| 2,029,735 | 2/1936 | Minott | 280/112 A |
| 2,641,480 | 6/1953 | Bancroft | 180/21 X |
| 2,739,658 | 3/1956 | Kolbe | 280/112 A X |

FOREIGN PATENTS OR APPLICATIONS

| | | | |
|---|---|---|---|
| 1,317,313 | 1/1963 | France | 180/21 |
| 1,378,894 | 10/1964 | France | 180/21 |

*Primary Examiner*—A. Harry Levy
*Attorney*—Waters, Roditi, Schwartz & Nissen

[57] ABSTRACT

A vehicle comprising steering wheels, driving wheels distinct therefrom and supporting most of the total weight of the vehicle, and means for swivelling said driving wheels through equal angles to either side of their positions parallel to the longitudinal axis of the vehicle, said means being controlled by a servomechanism comprising a transverse acceleration sensor.

The vehicle includes an axle carrying the driving wheels and mounted for pivotal motion in relation to the chassis about an axis lying in the longitudinal vertical plane of symmetry of the chassis and passing through a transmission joint, the pivotal motion of said axle being controlled by the said servomechanism.

6 Claims, 11 Drawing Figures

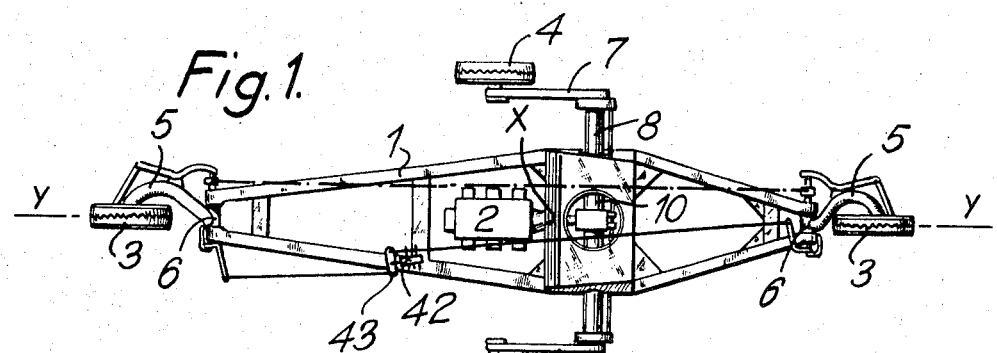
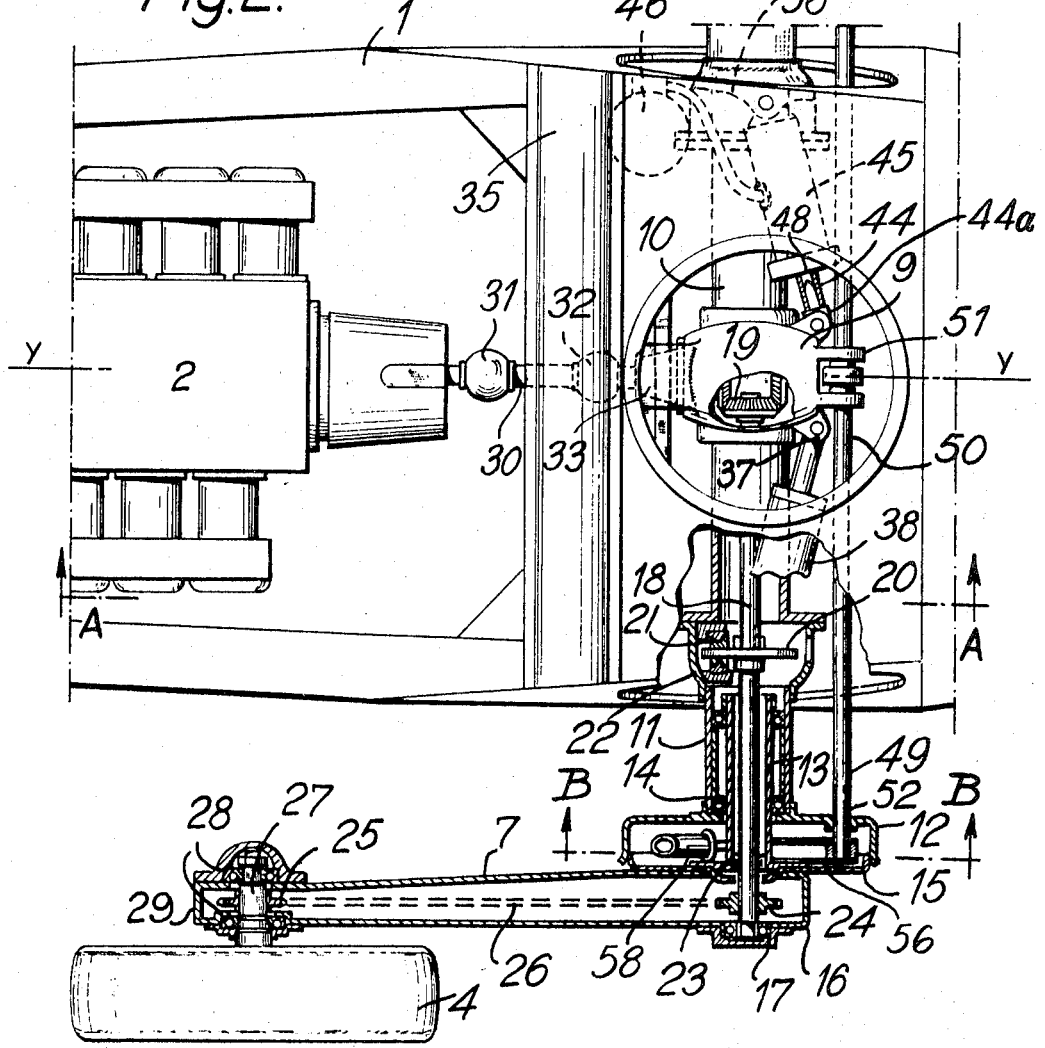

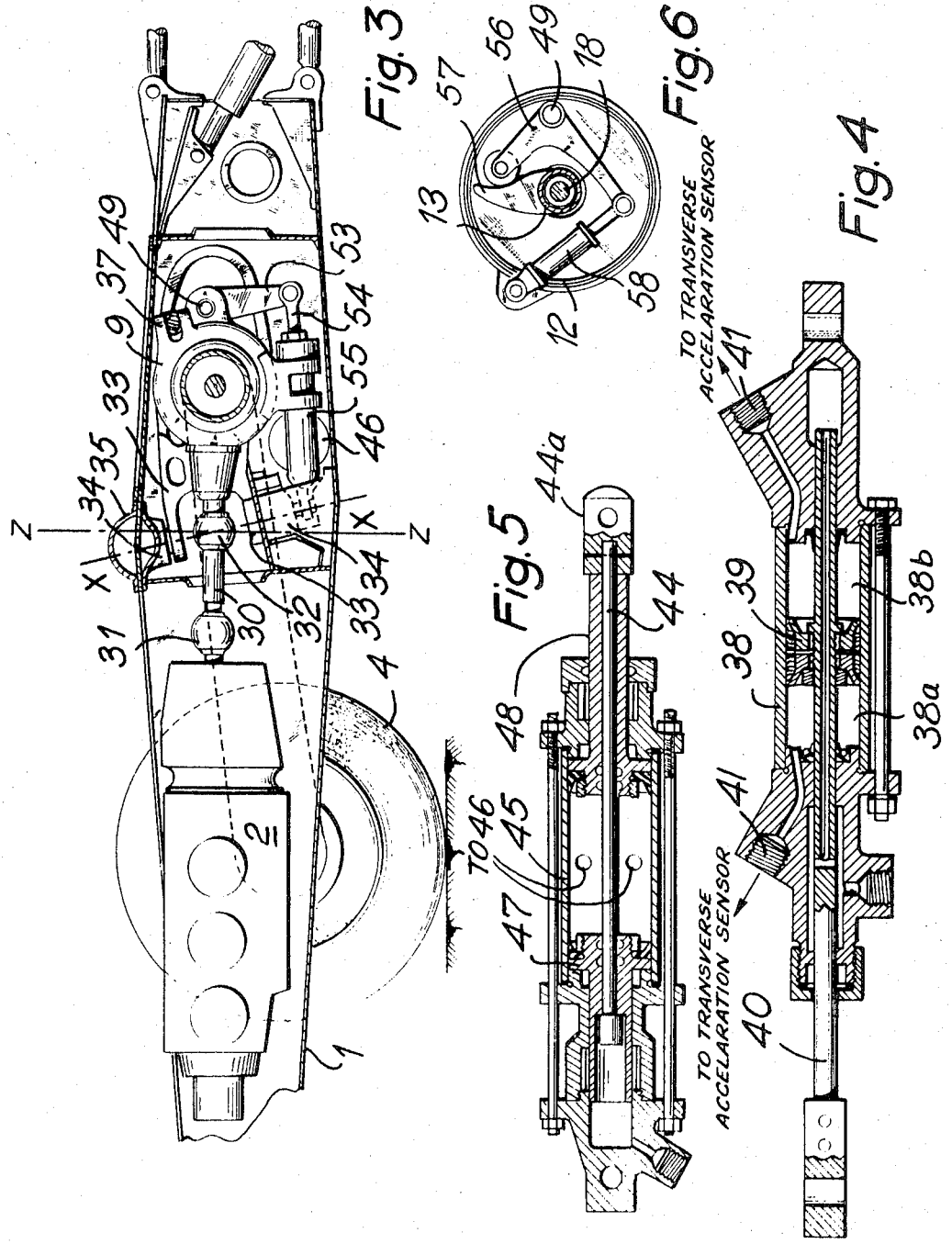

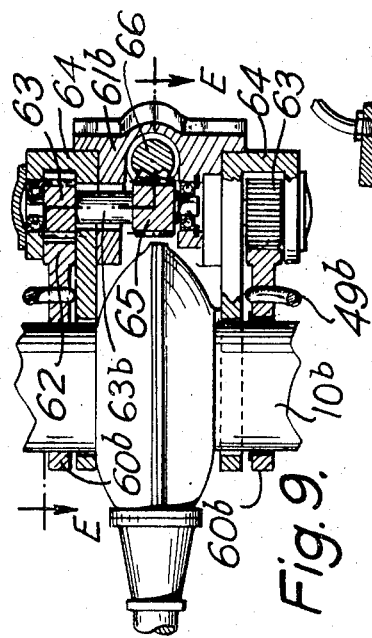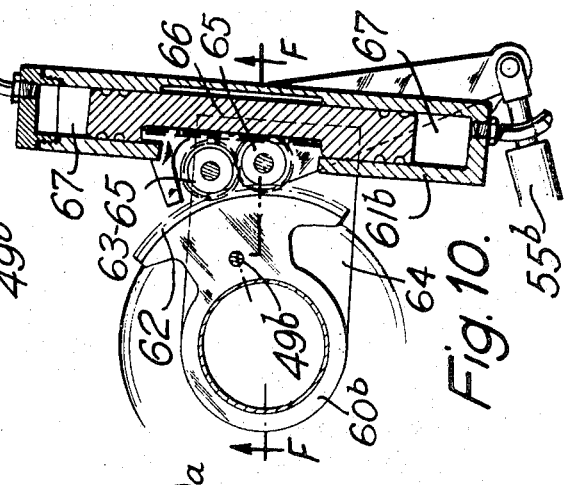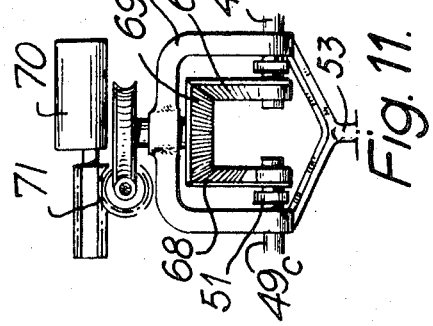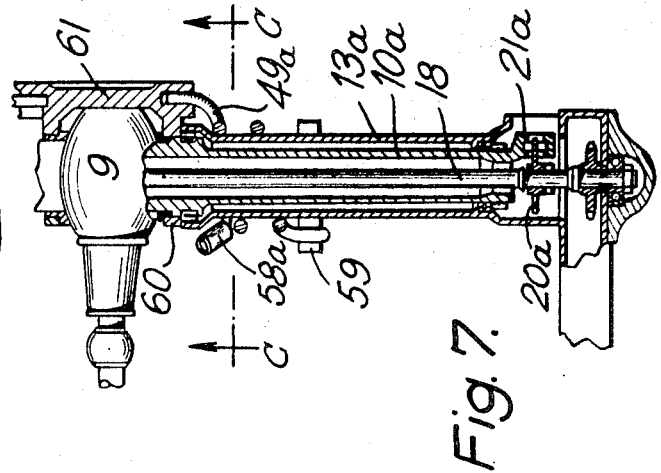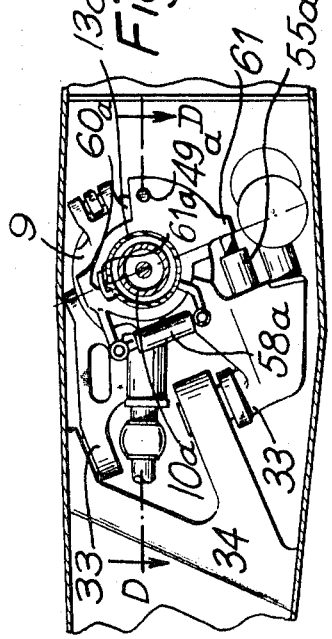

VEHICLES WITH INCIDENCE-ANGLE DRIVING WHEELS

The present invention relates to vehicles of the kind comprising steering wheels, driving wheels distinct therefrom and carrying most of the total weight of the vehicle, and means for swivelling the driving wheels through identical angles (hereinafter termed the "incidence angle") to either side of their positions parallel to the longitudinal axis of the vehicle, said means being controlled by a servomechanism comprising means for sensing the transverse acceleration to which the vehicle is subjected.

When the vehicle is cornering or running on a transversely sloping surface, the effect of the above arrangement is to cause the driving wheels to withstand all or most of the transverse reactions due to wheel adhesion which must balance the transverse loads, especially the centrifugal or gravity loads, whereby the steering wheels, being thus relieved of all or part of these loads, are better able to perform their steering function providing the limit of adhesion of the driving wheels is not exceeded.

In a known form of embodiment of such a vehicle, each driving wheel is supported by a wheel-carrying member mounted for pivotal motion about a vertical axis on a support fast with the chassis. The transmission accordingly includes universal joints which rotate at the same speed as the wheels and are consequently very powerful and very heavy.

It is accordingly one object of the present invention to provide a simplified embodiment of this kind that makes use of only one universal joint which rotates at engine speed and is consequently less powerful and less heavy.

In accordance with the invention, a vehicle of the above-mentioned kind includes an axle which carries the driving wheels and which is mounted for pivotal motion in relation to the chassis about an axis lying in the longitudinal vertical plane of symmetry of the chassis and passing through a transmission joint, the pivotal motion of said axle being controlled by said servomechanism.

The description which follows with reference to the accompanying non-limitative exemplary drawings will give a clear understanding of how the invention can be carried into practice.

In the drawings:

FIG. 1 is a plan view of a vehicle equipped with an axle according to the invention, the bodywork and interior equipment of which has been omitted for greater clarity.

FIG. 2 shows the central part of the said vehicle, on an enlarged scale and with partial cutaway to show the transmission and suspension.

FIG. 3 is a side view corresponding to FIG. 2, taken in section along the line A—A thereof.

FIG. 4 is a diametrical sectional view of a double-acting jack for controlling pivotal motion of the axle.

FIG. 5 is a likewise diametrical sectional view of an initially tensioned hydropneumatic restoring device for returning the axle to its midway position.

FIG. 6 is a sectional view of the device of FIG. 2, taken through the line B—B.

FIGS. 7 and 8 are views corresponding to those of FIGS. 2 and 3, illustrating an alternative embodiment of the system providing flexibility in roll, FIG. 8 being taken in section through the line C—C in FIG. 7, and FIG. 7 being take in section through the line D—D of FIG. 8.

FIGS. 9 and 10 are views corresponding to FIGS. 7 and 8 and illustrating the manner of mounting control means of sideway tilting of the chassis, FIG. 10 being a section taken through the line E—E of FIG. 9, and FIG. 9 being a section taken through the line F—F of FIG. 10, and FIG. 11 schematically portrays an alternative embodiment of said control means, as applied to the embodiment of FIG. 2.

The vehicle illustrated in FIG. 1 includes a chassis 1 which supports an engine 2, two steering wheels 3 and two driving wheels 4. The steering wheels are positioned on the longitudinal axis of the vehicle, at each end of the chassis, and are carried by arms 5 hingedly connected to transverse shafts 6 movable laterally with respect to the chassis. The driving wheels are arranged in the central part of the vehicle, on either side thereof, and are carried on two trailing arms 7 pivoting about a transverse axle 8.

As shown in FIG. 2, the axle 8 includes, as a single unit, a central differential casing 9 and two axle-tubes 10 on either side thereof. Each tube comprises an end-portion 11 fast with a drum 12. The portion 11 and the drum 12 contain a wheel-arm-supporting tube 13 which is rotatably supported in anti-friction bearings 14 for locating it in the portion 11 and which is fast with a flange 15 that closes the drum 12 and also with one end 16 of the associated wheel-carrying arm 7, which arm is formed as a long enclosure. Said end 16 receives in an anti-friction bearing 17 the end of a transmission shaft 18 issuing from the differential 19 housed in casing 9. Shaft 18 carries a brake disc 20 associated to pads 21 housed in a midway portion 22 of tube 10, and the said shaft is located inside tube 13 by means of an anti-friction bearing 23 and drives, through sprockets 24, 25 and a chain 26, a stub-axle 27 which is carried by means of anti-friction bearings 28 in the other end 29 of arm 7 and which supports the associated driving wheel 4.

As shown in FIG. 3, a transmission 30 comprising an ordinary universel joint 31 and a homokinetic joint 32 connects the engine 2 to the differential 19. The differential casing 9 carries two arms 33 positioned on either side of joint 32 and hingedly connected to two aligned pivots 34 which are carried respectively on extremely robust upper and lower cross-members 35 in such manner that their common axis X—X lies in the longitudinal vertical plane of symmetry of the vehicle, passes through the homokinetic joint 32, and runs downwardly and forwardly, the complete axle 8 being thus capable of pivoting about this axis.

Two thrust points 36 are provided on either side of the chassis above the tubes 10, and two lugs 37 are provided at the front of casing 9, on either side thereof. Between the one thrust point and the one lug is connected a double-acting jack of which the cylinder 38, as shown in FIG. 4, is separated by a piston 39 mounted on its rod 40 into two chambers 38a, 38b connected respectively to two control-fluid passing unions 41. These unions are connected to a sensor for detecting the transverse acceleration to which the vehicle is subjected, which sensor 42 may be of any convenient type well known per se but preferably of the kind which senses the algebraic sum of the transverse reactions exerted through the two steering wheels 3, which is described in French Pat. No. 1,378,894 with reference to FIGS. 1, 7 and 11, and which sensor is formed by a five-way hydraulic slide-valve controlled by a beam-lever 43 responsive to sideway movement of the shafts 6 against countering springs, or else of the same kind as the transverse accelerometer likewise described in the above-cited patent with reference to FIGS. 8 and 9 and associated to the slide-valve.

Between the other thrust point 36 and the other lug 37 is connected an initially tensioned elastic restoring device which, as shown in FIG. 5, is formed by a rod 44 and a cylinder 45 having its mid-section connected to a pressure-fluid source 46 and containing two pistons 47,48. The rod 44 is reciprocable in the pistons 47 and 48, one or the other of which can be shifted towards the middle of the cylinder, according as the rod 44 moves in one direction or the other. The head 44a, to which the rod 44 is pinned, abuts the piston 48 causing the said piston to move towards the piston 47 when the rod is retracted into the cylinder 45. The axle 8 being perpendicular to the longitudinal axis Y—Y (neutral position), the pistons 47 and 48 inside the cylinder 45 are urged against the ends of the cylinder by means of the fluid pressure delivered from 46. When the vehicle is turning, the axle rotates about the axis X—X and the rod 44 moves and displaces towards the middle either the piston 47 or the piston 48 according to the sense of motion of the rod 44. After the turning, the axle 8 is no longer submitted to a force from the double acting jack 38—40 and is restored in its neutral position, the pressure fluid urging the piston (47 or 48) which was displaced against the end of the cylinder 45, accordingly the rod resumes its initail position corresponding to the normal position of the axle 8.

The suspension system comprises two transverse torsion bars 49 positioned on either side of casing 9 and each supported for free rotation at one end 50 by a lug 51 formed on the casing 9 and at the other end 52 by the wall of the associated drum 12. The ends 50 of both these bars are rigidly united to a common link 53 hingedly connected to the rod 54 of a damped suspension member, for instance of the hydropneumatic type having its casing 55 spigoted into differential casing 9, on the plane of symmetry thereof, and hingedly connected to the lower pivot 34. The end 52 of each bar 49 supports, inside the casing formed by drum 12 and flange 15, a bellcrank lever 56 one arm of which bears through a follower upon a cam 57 rigid with the trailing-arm-supporting tube 13 and the other arm of which is hingedly connected to the rod of a hydraulic damper 58 itself hingedly connected to drum 12.

The above-described system functions in the following manner:

When the vehicle is cornering or running on a transversely sloping surface, a lateral force is exerted on steering wheels 3, and the servomechanism formed by the elements 6, 43, 42 and 38 causes the axle 8 to pivot about the axis X—X. This pivotal motion can be broken down into a rotation of the axle relatively to the chassis about a vertical axis Z—Z such that the driving wheels 4 assume an incidence angle which makes them support the greater part of the transverse reactions due to wheel adhesion (thereby relieving the load on the steering wheels and enabling them to better perform their steering function), and into a tilting of the chassis with respect to the axle, towards the inside of the bend, or towards the more elevated side of the ground, about the horizontal longitudinal axis Y—Y of the vehicle, thereby improving the comfort and roadholding qualities of the vehicle and eliminating crablike motion (which would increase its maximum apparent cross-sectional area). Rotation about the vertical axis Z—Z is usually limited, being for example less than approximately 20°. The inclination of axis X—X may be so chosen, for instance, as to ensure equal loading of the two wheels in a bend, for a given average turning radius and a given average speed, or so as to cause the wheels to be perpendicular to the ground for a given speed. The angle of tilt of the chassis in relation to the ground is likewise usually limited, being for example less than approximately 20°. The initial tensioning device 44, 45 restores the axle to its normal position after the same has deviated from the latter or in the event of failure of the servomechanism. Suspension in the vertical sense is provided by suspension member 54, 55, while flexibility in roll is provided by the torsion bar 49 and dampers 58.

In the alternative embodiment shown in FIGS. 7 and 8, the trailing-arm supporting tubes 13a surround the axle tubes 10a and two helical torsion springs 49a are each fitted between a reaction point 59 rigid with the corresponding tube 13a and a flange 60 which is rotatably mounted about the corresponding tube 10a between differential casing 9 and the tube 13a and which is connected to the other flange 60 surrounding the other axle tube 10a by a bridging member 61. The two roll dampers 58a are fitted between the tubes 13a and the flanges 60, and the vertical suspension member 55a between bridging member 61 and the lower arm 33 of casing 9. The brake systems 20a, 21a are disposed between the transmission shafts 18 and the axle-tubes 10a, inside the tubes 13a. In order to mitigate the effects of an accidental breakage of the spring 49a, each flange 60 embodies an aperture 60a inside which a radial peg 61a fast with trailing-arm-supporting tube 13a is movable, whereby deflection of the associated trailing-arm as a result of such a spring breakage may be limited to an amount consistent with safe control of the vehicle. The above-described alternative embodiment functions in the same manner as the embodiment described precedingly.

In the embodiment illustrated in FIGS. 9 and 10, the flanges 60b are not rigidly connected directly to bridging member 61b, instead of which each comprises a toothed sector 62 meshing with a spur gear 63, and the axes of the two gears 63 are carried at one end on member 61b by means of anti-friction bearings and at the other end on supporting flanges 64 which are rigid with member 61b and are rotatable about the axle tubes 10b. The spur-gear shafts 63b further support spur-gears 65 which mesh with each other, and one of which meshes likewise with a rack 66 capable of sliding inside the member 61b, which member accordingly forms an enclosure separated by said rack into two chambers 67 communicating with a pressure-fluid-actuated control system. The vertical-flexibility damper 55b is mounted between one limb of member 61b and the lower arm 33 of casing 9. Said control system thus makes it possible to cause rotation in opposite directions of the flanges 60b, and hence of the trailing-arms, through the agency of the springs 49b and the trailing-arm-supporting tubes, thereby allowing the desired sideway tilt to be imparted to the chassis relatively to the ground, which may be advantageous especially when the ground has a sharp transverse slope of, say, more than 20° and as much as 45°, or when the tilt resulting from the orientation of the axis X—X is insufficient to maintain the chassis in the desirable position. The said control system has the advantage of being operated independently by the driver or co-driver, for operation on rough terrain.

In the embodiment shown in FIG. 11, which is a variant on the embodiment of FIGS. 2 and 3, the torsion bars 49a are rigid with two sun gears 68 of a differential gearing whose planet pinion 69 is driven by an electric motor 70 through a two-stage reduction gearing 71 of the worm-and-pinion type, the planet-carrier 69a being rigid with the link 53. The embodiment functions in the same manner as that described precedingly.

It is to be noted that with a vehicle of the kind described hereinabove, assuming the weight distribution to be such that the center of gravity of the vehicle is located proximate the transverse line joining the contact surfaces of the driving wheels on the ground, then the driving-wheel swivelling servomechanism may operate so as to cause the algebraic sum of the transverse loads on the steering wheels to be either zero or minimal, the said sum being weighted if the steering wheels are not symmetrically disposed.

It goes without saying that many changes and substitutions of parts may be made in the exemplary embodiments hereinbefore described. Thus in the case of a vehicle designed to travel on transversely sloping surfaces continually, with few bends, the axis X—X could be disposed vertically instead of obliquely and be associated to a sideway-tilt control system of the kind described with reference to FIGS. 9 or 11, such control system being preferably inoperative when the vehicle is cornering but helping to keep the chassis horizontal on sloping surfaces. Furthermore, the vehicle could comprise a plurality of driving axles of the kind described precedingly, such an arrangement enabling the entire vehicle to move sideways bodily, for instance for parking purposes or, when traveling at high speed, for moving gradually out of a traffic lane without a change of heading, this latter faculty being especially advantageous in the case of high-speed road vehicles of great length, since it obviates the need to impart maneuver, angular velocities at the start and end of the maneuver, which is a frequent cause of loss of control in emergency attempts to avoid collision.

What I claim is:

1. A vehicle having a longitudinal vertical plane of symmetry and a chassis having front and rear ends, at least one steering wheel mounted on said chassis, at least one transverse driving axle supporting a driving wheel on each of its two ends and mounted for pivotal motion in relation to said chassis about an axis lying in said longitudinal vertical plane of symmetry, driving means mounted on said chassis, a transmission formed by a substantially longitudinal portion connected to said driving means and comprising at least one universal joint and by two lateral portions interconnected to said substantially longitudinal portion and said two driving wheels respectively, said axis passing through said universal joint, means for controlling said pivotal motion of the axle positioned between said axle and said chassis, and a servomechanism comprising transverse acceleration sensing means connected to said means for controlling pivotal motion of the axle.

2. A vehicle according to claim 1, wherein said axis is inclined at an angle to said chassis.

3. A vehicle according to claim 1, wherein said pivotal motion control means are formed by a double-acting jack connected between said axle and said chassis and activated by said servomechanism, means for restoring the axle into its neutral position being connected between said axle and said chassis.

4. A vehicle according to claim 1, wherein said two driving wheels are carried by two trailing arms which are pivotally mounted on said transverse axle at said two ends thereof respectively, for pivotal motion about the axis thereof.

5. A vehicle according to claim 4, comprising two transverse aligned torsion bars parallel to the axis of said transverse axle and each having an inboard end and an outboard end, said inboard ends of said torsion bars being positioned facing each other and being interconnected by a first damper reacting against said axle, and said outboard ends of said torsion bars being connected to said two trailing arms and to two further dampers, respectively, each of said further dampers reacts against said axle.

6. A vehicle according to claim 1, having two steering wheels disposed respectively at said front and rear ends of the chassis in said longitudinal vertical plane of symmetry, said axle being a single driving axle disposed between said front and rear ends of the chassis, and said vehicle having its center of gravity located proximate said driving wheels.

* * * * *